(12) United States Patent
Komoda (10) Patent No.: US 11,237,411 B2
(45) Date of Patent: Feb. 1, 2022

(54) NOSE PAD AND EYEWEAR

(71) Applicant: JINS HOLDINGS Inc., Maebashi (JP)

(72) Inventor: Taiki Komoda, Gunma (JP)

(73) Assignee: JINS HOLDINGS Inc., Maebashi (JP)

( * ) Notice: Subject to any disclaimer, the term of this patent is extended or adjusted under 35 U.S.C. 154(b) by 251 days.

(21) Appl. No.: 16/698,098

(22) Filed: Nov. 27, 2019

(65) Prior Publication Data

US 2020/0174286 A1    Jun. 4, 2020

(30) Foreign Application Priority Data

Dec. 3, 2018    (JP) .............................. JP2018-226571

(51) Int. Cl.
*G02C 5/12* (2006.01)
*G02C 11/00* (2006.01)

(52) U.S. Cl.
CPC ................ *G02C 11/10* (2013.01); *G02C 5/12* (2013.01)

(58) Field of Classification Search
CPC ... G02C 5/12; G02C 5/00; G02C 5/02; G02C 11/00; G02C 11/10; G02C 5/122; G02C 2200/18; G02C 5/14; A61B 5/0496; A61B 5/6803

USPC ................... 351/136, 137, 138, 139, 158, 41
See application file for complete search history.

(56) References Cited

U.S. PATENT DOCUMENTS

| | | | |
|---|---|---|---|
| 2017/0027470 A1 | 2/2017 | Inoue et al. | |
| 2017/0060252 A1* | 3/2017 | Komaki | G06F 3/0485 |
| 2018/0160973 A1 | 6/2018 | Inoue et al. | |
| 2019/0239770 A1 | 8/2019 | Komoda | |

FOREIGN PATENT DOCUMENTS

| | | |
|---|---|---|
| JP | 2015-202185 A | 11/2015 |
| JP | 2017-191142 A | 10/2017 |
| JP | 2017-192548 A | 10/2017 |
| JP | 2019-195591 A | 11/2019 |
| WO | WO 2016/052168 A | 4/2016 |

* cited by examiner

*Primary Examiner* — Hung X Dang
(74) *Attorney, Agent, or Firm* — Wolf, Greenfield & Sacks, P.C.

(57) ABSTRACT

A nose pad includes: an attachment structure attachable to an eyewear; two electrodes provided on a surface of the nose pad; and a substrate provided inside the nose pad and including a battery, a processor, an analog/digital converter, and a communication device.

11 Claims, 5 Drawing Sheets

NOSE PAD AND EYEWEAR

CROSS-REFERENCE TO RELATED APPLICATIONS

This application claims priority under 35 U.S.C. § 119 (a)-(d) to Japanese Application No. 2018-226571, filed Dec. 3, 2018, entitled "NOSE PAD AND EYEWEAR," the contents of which are hereby incorporated by reference in their entirety.

BACKGROUND

Field

The present invention relates to a nose pad and an eyewear.

Description of Related Art

Conventionally, the technology of providing an electrode at a prescribed position of an eyewear and acquiring a biological signal has been known. For example, the technology of attachably/detachably mounting human-body characteristics detection equipment having a glabella electrode and a nose electrode at a bridge portion of an eyewear has been known (see WO 2016/052168).

SUMMARY

However, when human-body characteristics detection equipment is mounted on a bridge, a state in which an eye potential is acquired is recognizable by others since the human-body characteristics detection equipment is special equipment. Therefore, it cannot be said that a user naturally wears an eyewear.

In view of the above problem, the present invention has an object to provide: a nose pad that is attachable to an ordinary eyewear and makes it possible to appropriately acquire and process a biological signal while causing a user to naturally use the eyewear; and an eyewear.

A nose pad according to an aspect of the present invention includes: an attachment structure attachable to an eyewear; two electrodes provided on a surface of the nose pad; and a substrate provided inside the nose pad and including a battery, a processor, an analog/digital converter, and a communication device.

According to the present invention, it becomes possible to provide: a nose pad that is attachable to an ordinary eyewear and makes it possible to appropriately acquire a biological signal while causing a user to naturally use the eyewear; an eyewear.

DETAILED DESCRIPTION

Hereinafter, an embodiment of the present invention will be described in detail with reference to the drawings. However, the following embodiment will be given only for illustration and not intend to exclude various modifications or the application of technologies not explicitly described below. That is, the present invention may be modified in various ways and carried out without departing from its spirit. Further, in the following descriptions of the drawings, the same or similar portions will be denoted and expressed by the same or similar reference signs. The drawings are shown schematically and do not necessarily match actual dimensions, ratios, or the like. Even among the drawings, some portions may possibly be different from each other in dimensional relationships or ratios.

Embodiment

Eyewear

Figure 1:
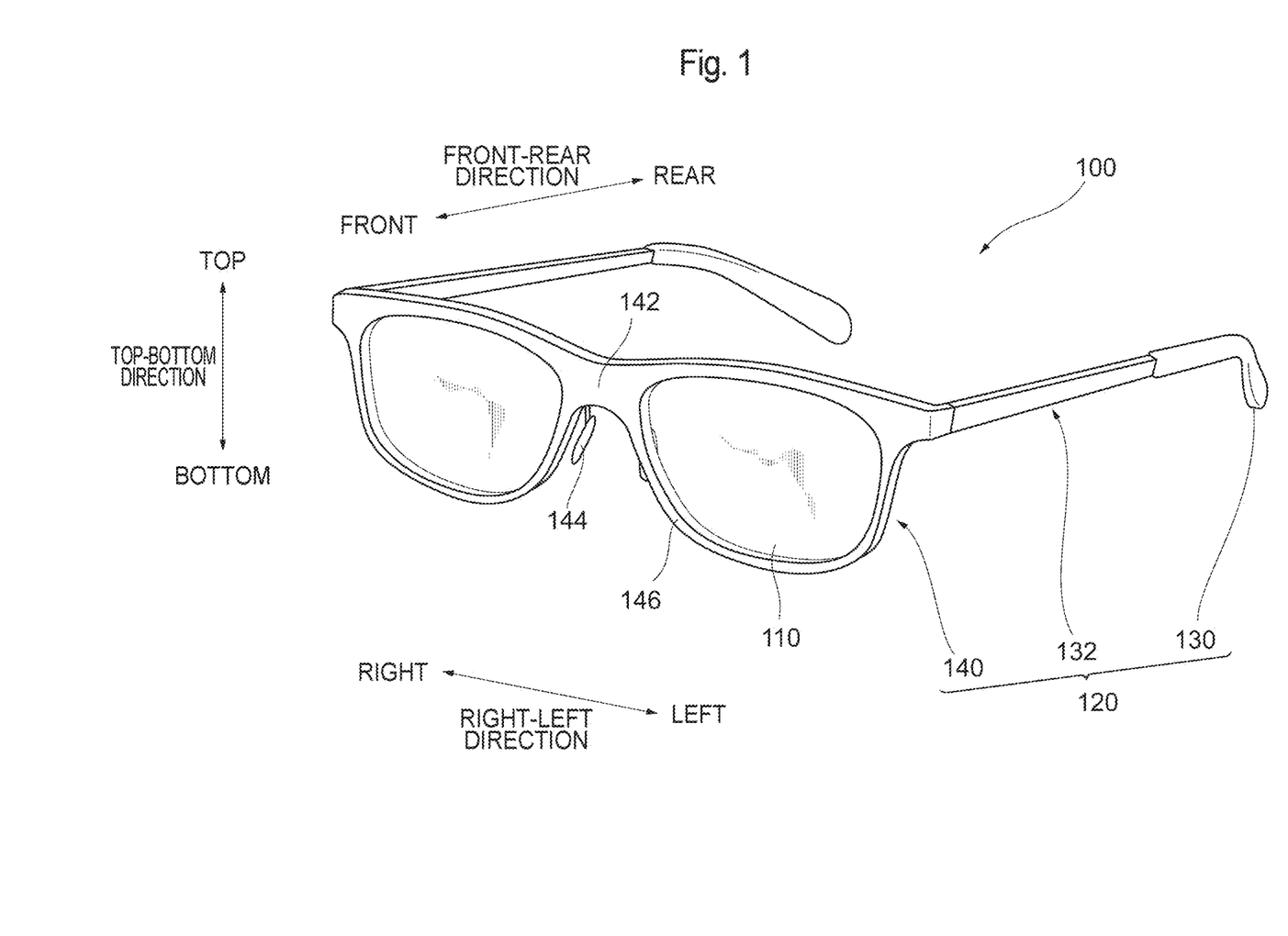
FIG. 1 is a perspective view showing an example of an eyewear according to an embodiment, the eyewear being seen from its front side.

FIG. 1 is a perspective view showing an example of an eyewear 100 according to the embodiment, the eyewear 100 being seen from its front side. As shown in FIG. 1, the eyewear 100 refers to, for example, glasses and includes a pair of lenses 110 and a frame 120. Note that the lenses 110 will be described as a pair of lenses in the present embodiment but is not necessarily required to be a pair of lenses. Further, the lenses 110 will be described as constituents of the eyewear 100 in the present embodiment, but the lenses 110 themselves are not necessarily required to be the constituents of the eyewear 100.

The frame 120 includes, for example, a front 140, a pair of temples 132 rotatably connected to both ends on the right and left sides of the front 140, and a pair of temple tips 130 attached on the rear sides of the pair of temples 132. Further, the frame 120 holds the pair of lenses 110 and holds the lenses 110 and the front 140 in an appropriate position with respect to the eyes and head of a user.

The front 140 supports the pair of lenses 110. The temples 132 press the temporal regions of the head of the user together with the temple tips 130 and sandwich the same. Further, the temple tips 130 make contact with the upper regions and rear regions of the ears of the user and prevent the drop of the eyewear 100. Note that the temple tips 130 are not necessarily required configurations for the eyewear 100.

In the following descriptions, the longitudinal direction of the front 140 shown in FIG. 1 will be defined as a "right-left direction" that is an example of a second direction for the sake of convenience. Further, a left side when seen from the user (right side in FIG. 1) and a right side when seen from the user (left side in FIG. 1) will be defined as a "left side" and a "right side," respectively, when the eyewear 100 is worn. In addition, the short direction of the front 140 and the thickness direction of the front 140 will be defined as a "top-bottom direction" that is an example of a first direction and a "front-rear direction", respectively.

Note that the eyewear 100 to which the present embodiment is applied is formed to be symmetrical about a glabella part (bridge) 142 that will be described later. Therefore, in the following descriptions, symmetrical configurations will not be distinguished from each other between the right and left sides, and only configurations on one of the right and left sides in the drawings will be denoted by reference sings and described.

The front 140 has, for example, a plate-shaped structure extending along the right-left direction and curved to protrude to the front side to fit along the face of the user. Further, the front 140 has the glabella part 142 at its center, a pair of nose pads 144 attached on both right and left sides of the rear surface of the glabella part 142, a pair of rims 146 formed at both right and left ends of the glabella part 142, a pair of end pieces (not shown) formed at the respective ends of the pair of rims 146, and a pair of first hinge portions (not shown) attached to the rear surfaces of the pair of end pieces.

The glabella part 142 connects the left portion and the right portion of the front 140 (the eyewear 100) to each other. Further, the glabella part 142 is, for example, a curved plate-shaped member and made of a resin or the like.

The nose pads 144 support the front 140 by sandwiching the nose of the user from both sides and maintain the height or the like of the front 140 with respect to the eyes of the user. Further, each of the nose pads 144 is, for example, a part of an adjustable type having a resin pad part and a metal support part. Note that the deformation of the pad parts and the support parts makes it possible to slightly adjust the position of the front 140 (for example, the distance between corneal vertices) with respect to the nose and eyes of the user.

Figure 2A:
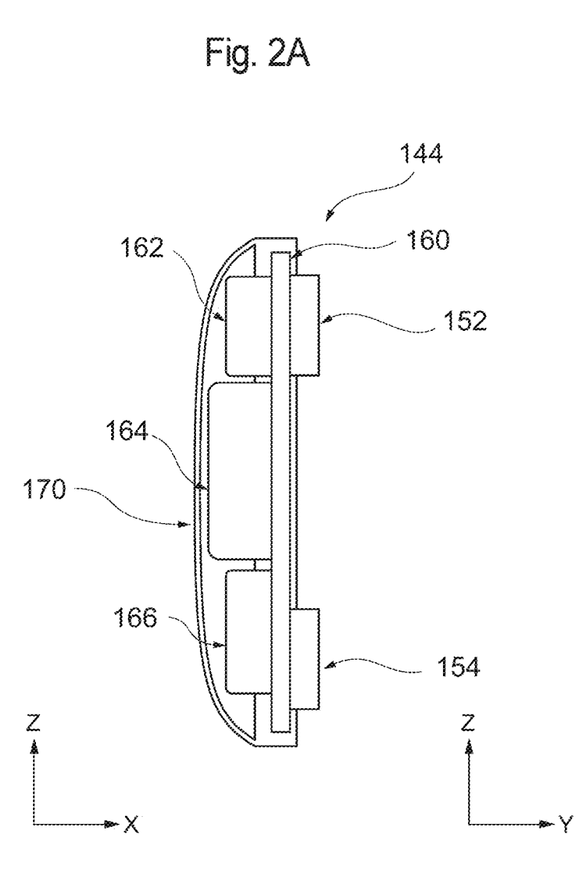
FIGS. 2A and 2B are views showing an example of a nose pad according to an embodiment.
Figure 2B:
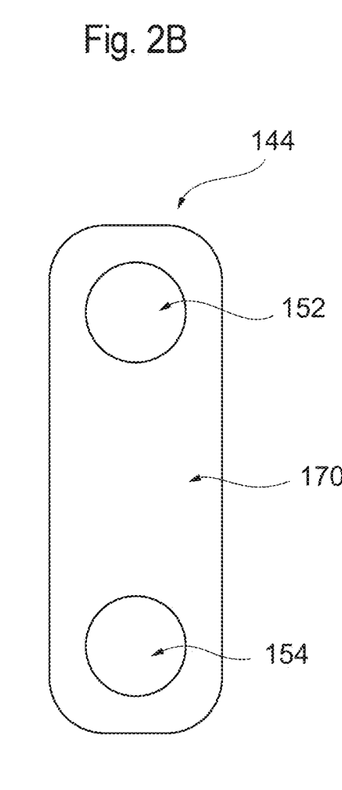

Further, the nose pads 144 according to the present embodiment are designed so that the support part and the pad part are attachable to and detachable from each other or the support part and the front are attachable to and detachable from each other, and that the support part and/or the pad part has an attachment structure. Further, as shown in FIGS. 2A and 2B and the subsequent figures, the pad parts have at least two electrodes on their surfaces and a processing unit (that may or may not be completely covered with a resin) that processes a biological signal inside the pad parts.

The rims 146 hold the lenses 110. Further, the rims 146 are, for example, ring-shaped members formed to fit along the shapes of the lenses 110 and made of a resin or the like.

The end pieces (not shown) have the first hinge portion (not shown). Further, the end pieces are, for example, curved plate-shaped members and made of a resin or the like.

The first hinge portions function as, for example, connection parts and rotatably connect the temples 132 to the front 140 in combination with plate-shaped second hinge portions (not shown) formed on the temples 132. That is, the first hinge portions and the second hinge portions constitute hinges.

The temples 132 are L-shaped members curved to fit the temporal regions. Further, the temples 132 are connected to be rotatable from a folding position at which an angle formed between the temples 132 and the front 140 is the smallest to a position at which the angle formed between the temples 132 and the front 140 is the largest.

Nose Pad

FIGS. 2A and 2B are views showing an example of the nose pad according to the embodiment. FIG. 2A shows a sectional view of the nose pad 144 in an X-Z plane, and FIG. 2B shows a surface view of the nose pad 144 in a Y-Z plane. Note that when the nose pad 144 shown in FIGS. 2A and 2B is assumed as the nose pad 144 on the right side, an X direction shows the left side in the right-left direction, a Z direction shows the top side in the top-bottom direction, and a Y direction shows the rear side in the front-rear direction.

As shown in FIG. 2A, the nose pad 144 has at least a first electrode 152 and a second electrode 154 on its surface that makes contact with the skin of the nose. The distance between the centers of the two electrodes is not limited to but includes 12 mm as an example, and the diameter of the respective electrodes is not limited to but includes 3 mm as an example. Further, the size of the nose pad 144 is 15 mm in the Z direction and 5 mm in the Y direction as an example.

The first electrode 152 and the second electrode 154 are not covered with a resin 170 and detect an eye potential of the right eye of the user by making direct contact with the skin of the nose. Like this, electrodes for detecting an eye potential are provided on the surface of the nose pad 144 that naturally makes contact with the skin of the user. Thus, compared with a case in which two pairs of electrodes make contact with the top and bottom sides of the eyes of the user, burdens on the skin of the user may be reduced. Note that the first electrode 152 and the second electrode 154 may detect a myoelectric potential of the nose or brain waves.

When a third electrode and a fourth electrode are also provided on the nose pad on the left side in the embodiment, the first electrode 152 and the third electrode may be, for example, used as ground electrodes (grounds). Further, values detected by the ground electrodes are almost zero. Depending on the purpose of detecting an eye potential, a differential value between a first potential of the first electrode 152 on the right side and a second potential of the second electrode 154 on the right side or an average value of the first potential and the second potential is used. Eye potential signals detected by the respective electrodes are output to a processing device 166.

Further, the nose pad 144 has, although not shown in FIGS. 2A and 2B, an attachment structure attachable to the eyewear 100. For example, the attachment structure may be any structure so long as the structure is provided at the glabella part 142 of the eyewear 100 or a support part (for example, a metal rod-shaped member) attached to the glabella part 142 and allows the attachment and detachment of the nose pad 144. Further, the attachment structure attachable to the eyewear 100 includes an attachment structure for a support part attachable to and detachable from the nose pad 144 and a support part itself attachable to and detachable from the eyewear 100.

Figure 3:
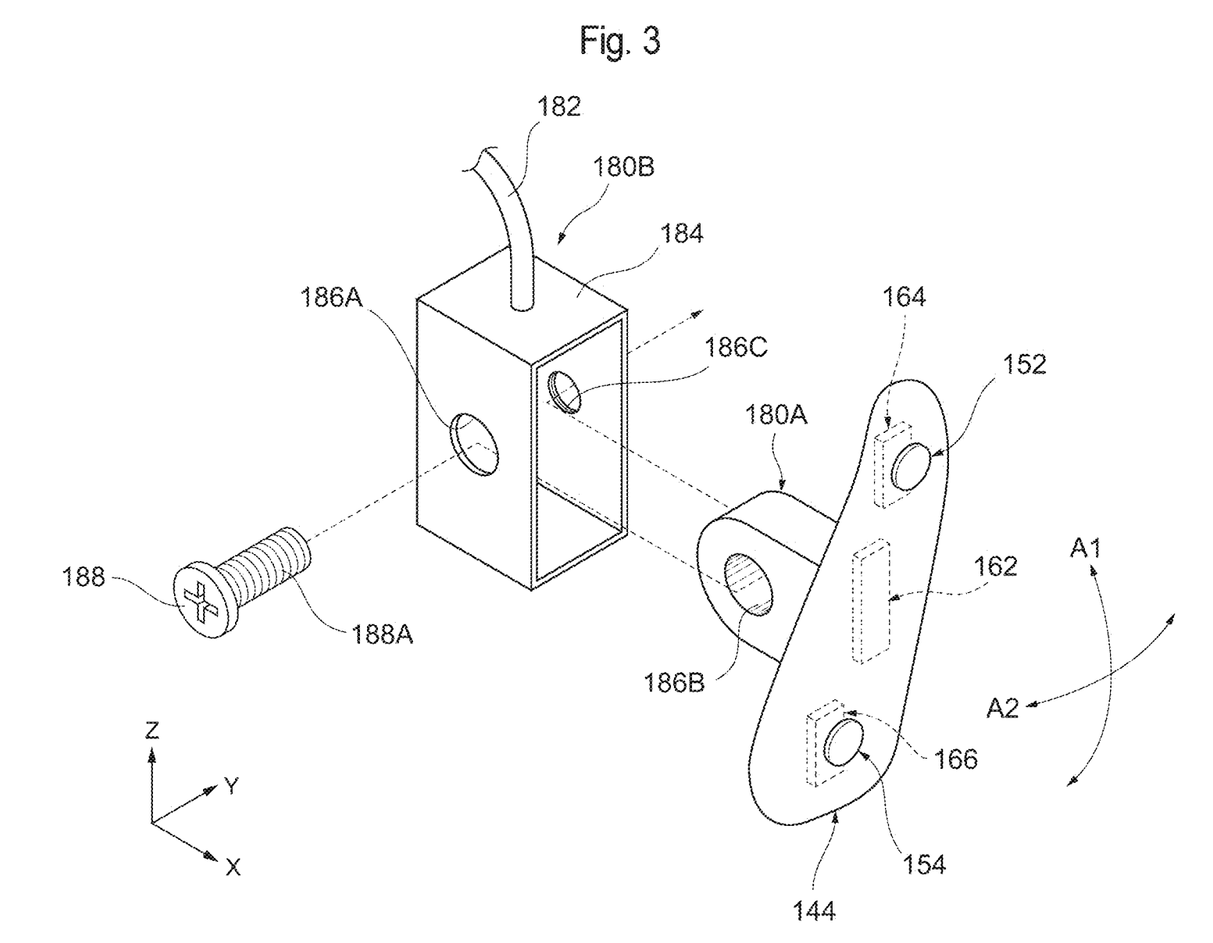
FIG. 3 is a view showing an example of a nose pad 144 and an attachment structure (part 1) according to the embodiment.
Figure 4:
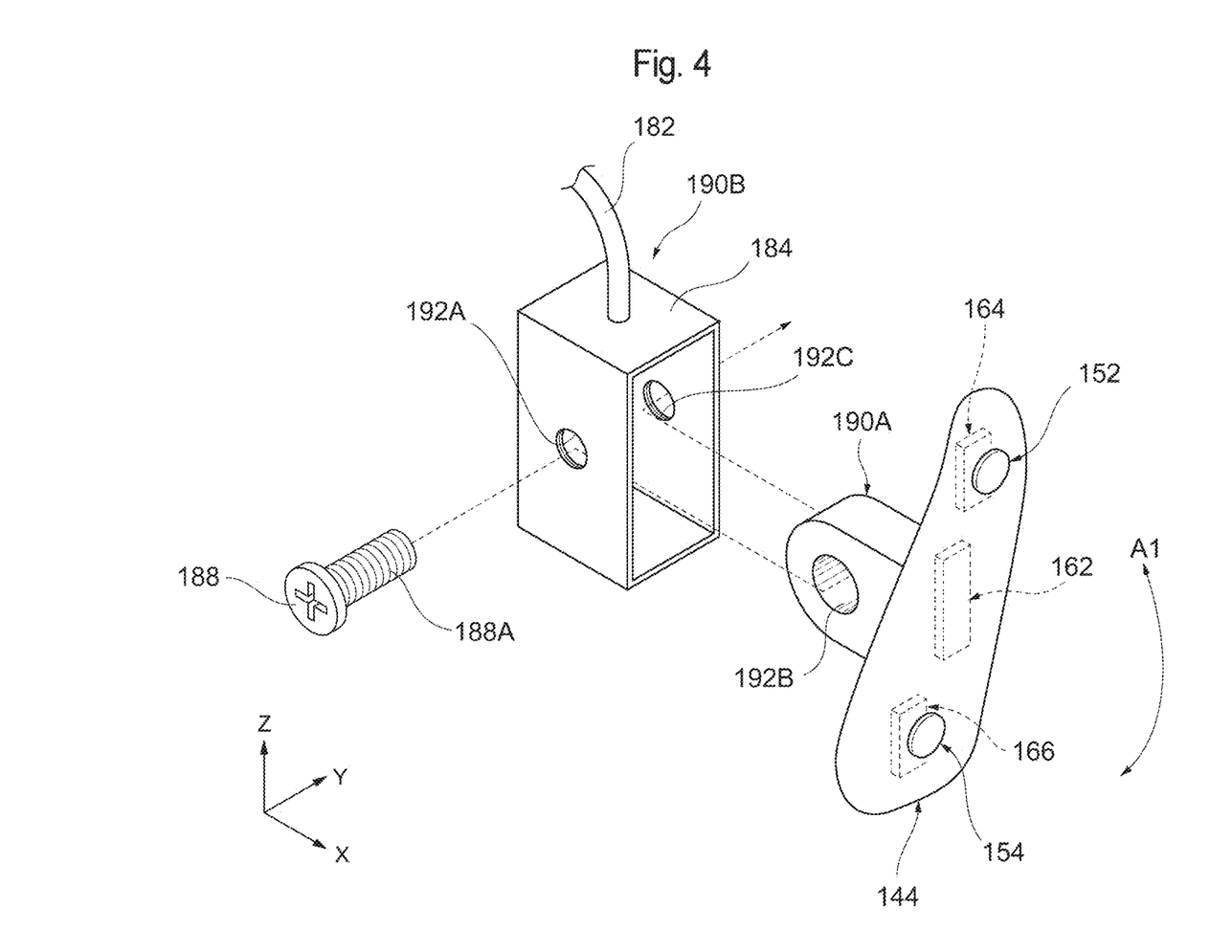
FIG. 4 is a view showing an example of the nose pad 144 and an attachment structure (part 2) according to the embodiment.

When the nose pad 144 is, for example, a part of an adjustable type as shown in FIGS. 3 and 4, the attachment structure of the nose pad 144 has a screw hole that causes a screw to pass therethrough and the portion of the attachment structure of the nose pad 144 is inserted into the box part of an attachment structure. Then, when, the screw is caused to pass through two screw holes provided on the box part and the screw hole of the attachment structure so as to penetrate the same and then rotated, the nose pad 144 and the box part of the attachment structure are fixed to each other.

Further, other attachment structures may include, when the eyewear 100 and the support part or the support part and the nose pad 144 satisfy a specific relationship (positional relationship), structures that do not allow the nose pad 144 to be easily detached. As specific examples, the respective attachment structures may include: a sliding structure that is provided with a rail and slides into any module to be attached to the respective attachment structures; a fitting structure in which a shaft is fitted in a hole to attach the nose pad 144; a locking structure; a screwing structure in which a screw hole is provided to perform screwing; and an attachment structure that attaches the nose pad 144 using adhesion like a hook-and-loop fastener. The above attachment structures are small attachment structures provided at a part of the nose pad 144.

Further, there is an eyewear integrated with nose pads as in a resin frame. In the case of the eyewear, the adhesion and attachment of the nose pads 144 to the surfaces of the nose pads integrated with a frame is made possible.

A processing unit is provided inside the nose pad 144. The processing unit includes a substrate 160 including an acceleration sensor 162, a battery 164, and a processing device 166 containing a processor, an analog/digital converter, and a communication device. The substrate 160 is an electronic circuit substrate electrically connected to the respective units. Further, the processing unit may include an amplification unit (not shown) that amplifies a slight eye potential.

The acceleration sensor 162 is, for example, a triaxial acceleration sensor. Further, the acceleration sensor 162 outputs a detected sensor signal to the processing device 166.

When the processing device 166 contains an amplification unit, the processing device 166 may acquire an amplified eye potential signal from the amplification unit and process the same or may acquire eye potential signals from the electrodes and process the same. For example, the analog/digital converter may convert eye potential signals detected by the respective electrodes into digital signals and output the converted signals to the amplification unit, or may convert an eye potential signal amplified by the amplification unit into a digital signal.

The processor inside the processing device 166 may process a reference eye potential signal indicating a potential of the second electrode 154 with respect to the first electrode 152. At this time, the processor inside the processing device 166 may perform processing to generate a signal indicating the vertical movement of an eye on the basis of eye potentials detected from the respective electrodes in the right eye or the left eye.

The communication device inside the processing device 166 transmits respective signals processed by the processor to external equipment. For example, the communication device transmits respective signals to the external equipment through wireless communication such as Bluetooth® and wireless LAN or wired communication.

The external equipment is information processing equipment having communication function. For example, the external equipment is a mobile communication terminal such as a mobile phone and a smart phone, a personal computer, or the like possessed by the user. The external equipment performs processing based on a signal related to an eye potential received from the communication device contained in the processing device 166. For example, the external equipment detects blinking or the movement of a visual line from a signal related to a received eye potential.

Further, the external equipment is only required to use an average value of two acceleration data items when receiving the acceleration data items of the acceleration sensors 162 from the respective right and left nose pads.

The battery 164 supplies power to the acceleration sensor 162 and the processing device 166. The battery 164 is suitably a charging type battery.

As shown in FIG. 2B, the surface of the nose pad 144 is covered with the resin 170 but the first electrode 152 and the second electrode 154 are not covered with the resin 170 to make direct contact with the skin.

Further, components are provided on both surfaces of the substrate 160 contained inside the nose pad 144. For example, the acceleration sensor 162, the battery 164, and the processing device 166 are provided on one surface of the substrate 160, and the first and second electrodes 152 and 154 are provided on the other surface thereof. Thus, the miniaturization of the nose pad 144 is made possible.

Rotation Mechanism (Part 1)

FIG. 3 is a view showing an example of the nose pad 144 and an attachment structure (part 1) according to the embodiment. In the example of FIG. 3, the attachment structure of a general adjustable type is shown. The nose pad 144 shown in FIG. 3 contains an attachment structure 180A on its surface on a side opposite to the first electrode 152 or the like. The attachment structure 180A has a screw hole 186B constituting a rotation mechanism.

An attachment structure 180B contains a support part 182 (nose pad arm) and a box part 184 (nose pad box) connected to the support part 182. The box part 184 has screw holes 186A and 186C. Here, the diameters of the screw holes 186A and 186B are larger than a screw diameter 188A of a screw 188 and larger than the diameter of the screw hole 186C. The diameter of the screw hole 186C is almost the same as the screw diameter 188A. Note that the screw 188 is fixed at the screw hole 186C. As shown in FIG. 3, the movability of the nose pad 144 in an A1 direction is allowed about a screw axis, and the movability of the nose pad 144 in an A2 direction is allowed with movement (backlash) caused when the diameters of the screw holes 186A and 186B are larger than the screw diameter 188A.

The acceleration sensor 162 is provided at a position adjacent to the screw hole 186B constituting the rotation mechanism. In the example shown in FIG. 3, the acceleration sensor 162 is provided at a central part in a Z direction inside the nose pad 144. Thus, the provision of the acceleration sensor 162 at the position adjacent to the screw hole 186B (preferably a position in the substrate 160, the position being at the shortest distance from the screw hole 186B) allows a reduction in the influence of vibration caused by the rotation of the nose pad 144.

Rotation Mechanism (Part 2)

FIG. 4 is a view showing an example of the nose pad 144 and an attachment structure (part 2) according to the embodiment. In the example of FIG. 4, the attachment structure of a general adjustable type is shown. The nose pad 144 shown in FIG. 4 contains an attachment structure 190A on its surface on a side opposite to the electrode 152 or the like. The attachment structure 190A has a screw hole 192B constituting a rotation mechanism.

An attachment structure 190B contains the support part 182 and the box part 184 connected to the support part 182. The box part 184 has screw holes 192A and 192C. Here, the diameters of the screw holes 192A and 192C are almost the same as the screw diameter 188A of the screw 188. The diameter of the screw hole 192B is slightly larger than or almost the same as the screw diameter 188A. Note that the screw 188 is fixed at at least the screw holes 192A and 192C. As shown in FIG. 4, the movability of the nose pad 144 in the A1 direction is allowed about the screw axis, but the nose pad 144 does not rotate in other directions.

The acceleration sensor 162 is provided at a position adjacent to the screw hole 192B constituting the rotation mechanism. In the example shown in FIG. 4, the acceleration sensor 162 is provided at a central part in the Z direction inside the nose pad 144. Thus, the provision of the acceleration sensor 162 at the position adjacent to the rotation mechanism (in the axis direction of the screw hole 192B) that rotates along the surface of the nose in the top-bottom direction (preferably a position in the substrate 160, the position being at the shortest distance from the screw hole 192B) allows a further reduction in the influence of vibration caused by the rotation of the nose pad 144.

Feeding Terminal

Figure 5:
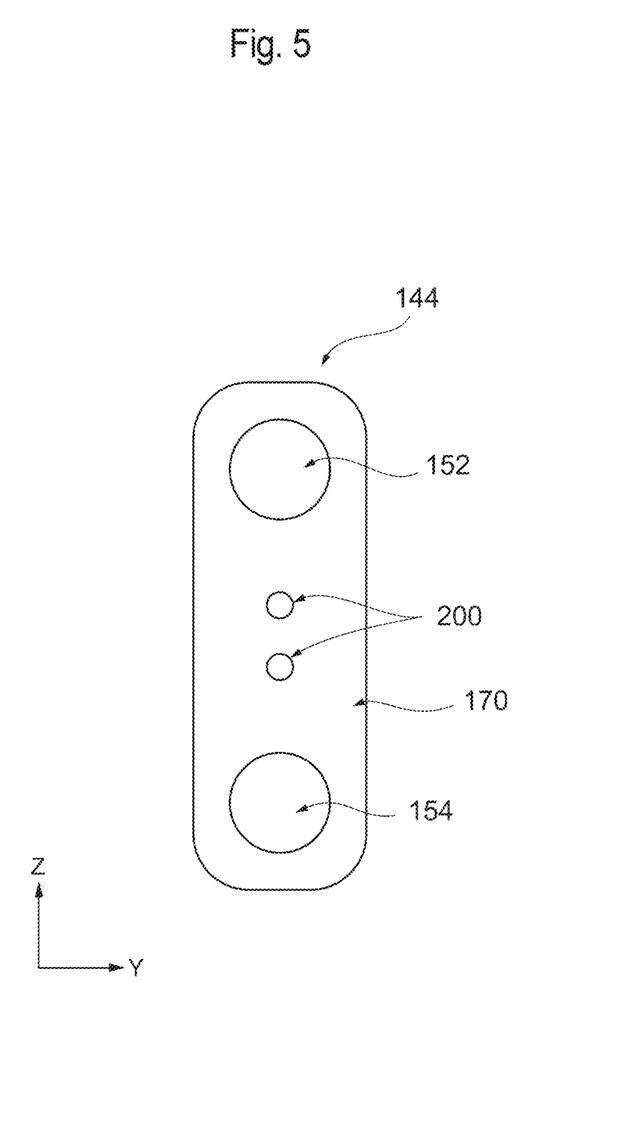
FIG. 5 is a view showing the positions of feeding terminals according to the embodiment.

FIG. 5 is a view showing the positions of feeding terminals according to the embodiment. The battery 164 is assumed as a charging type battery. At this time, feeding terminals for feeding power to the battery 164 are required.

In an example shown in FIG. 5, however, two feeding terminals 200 are provided on the surface on the side of the electrodes. Thus, even in a state in which the nose pad 144 has been attached to the eyewear 100, the charging of the battery 164 via the feeding terminals is made possible regardless of the position of the support part of the like.

As described above, the embodiment makes it possible to provide: a nose pad that is attachable to an ordinary eyewear and makes it possible to appropriately acquire and process a biological signal while causing a user to naturally use the eyewear; and an eyewear. Further, in the related art, the frame of an eyewear to which detection equipment is attached is a dedicated product and therefore restricted in design compared with a commercially-available ordinary eyewear. However, the above embodiment makes it possible to cause a wearer to freely wear an eyewear according to the embodiment while maintaining fashionability without being subjected to constrains on frame design. Further, since the preparation of a frame as a dedicated product is not required, it becomes possible to put only a nose pad in circulation as a product and bring efficiency to manufacturing and distribution cost.

Further, according to the nose pad described above, portions that are required to be adjusted may be collected in one place of the nose pad compared with a case in which a nose pad, a nose pad arm, a reference electrode at a glabella, or the like is each adjusted. Further, a miniaturized nose pad is made attachable to a commercially-available eyewear when being embedded with electrodes, a processor, or the like to be formed into a retrofittable one. Further, in terms of an eyewear, the appropriate acquisition or processing of a biological signal such as an eye potential signal is allowed, while the natural use of the eyewear is made possible visually.

Modified Examples

The above amplification unit may perform arithmetic processing to calculate a differential value or an average value described above with respect to sampling values of respective eye potential signals before or after being amplified if the amplification unit has a processing unit that performs the arithmetic processing on the eye potential signals. A signal amplified or processed by the amplification unit is output to the processor.

Here, the processing for an eye potential signal described above is performed on the condition that the respective electrodes are appropriately in contact with the nose. However, there is a case that one or more of the electrodes are not in contact with or are in poor contact with the nose depending on the fitting condition of the eyewear 100. Particularly, if the first electrode 152 is not in contact with or is in poor contact with the nose when the first electrode 152 at the upper end serves as a ground electrode, the acquisition of an appropriate eye potential signal is not allowed. Therefore, the right and left electrodes are connected to each other so that the appropriate acquisition of an eye potential is made possible even if a part of the electrode at the upper end is not in contact with or is in poor contact with the nose.

For example, the appropriate acquisition of an eye potential is made possible with the employment of a physical configuration even if a part of the electrode at the upper end is not in contact with or is in poor contact with the nose. For example, a configuration is employed in which the electrodes at the upper ends are connected (electrically connected) to each other to allow a potential of an electrode in contact with the nose to be commonly used as the reference potential of the electrodes at both the upper ends. For example, with members for connection threaded through a bridge and the right and left support parts beforehand, the upper electrodes of the respective nose pads 144 are connected to each other when the right and left nose pads 144 are attached to the support parts. The members for connection are, for example, metal wires, or the like. Further, since the members are threaded through the support parts or the frame, the members are made visually unrecognizable from an outside.

Thus, a pair of the electrodes of the right and left nose pads is electrically connected to each other. Therefore, if one of the electrodes is appropriately in contact with the nose, the processor or the like of the processing device 166 is allowed to commonly use a potential of the one electrode as a reference potential between both the electrodes.

Further, the respective electrodes of the right and left nose pads are used and electrically connected to each other, whereby the electrodes are allowed to be in contact with the nose as a contact target in two directions. As a result, the possibility that at least one of the electrodes is appropriately in contact with the nose may be increased.

Further, the connection of reference potentials of the right and left nose pads allows the calculation of the difference between right and left potentials. Therefore, the acquisition of the movement of right and left visual lines is also made possible. Note that the detection of the movement of visual lines is made possible by external equipment that receives respective right and left eye potential signals even if a pair of the electrodes of the right and left nose pads is not connected to each other.

In the above embodiment, the acceleration sensor 162 is provided inside the nose pad 144. However, the acceleration sensor 162 is not necessarily a required configuration. For example, the substrate 160 including the battery 164 and the processing device 166 may be provided in the nose pad 144 as a simple version.

The present invention is described above using the respective embodiments. However, the technical scope of the present invention is not limited to the scope described in the above embodiments. It is obvious for persons skilled in the art that various modifications or improvements could be added to the above embodiments. It is obvious from the descriptions of claims that modes to which such modifications or improvement are added could also be included in the technical scope of the present invention.

What is claimed is:

1. A nose pad comprising:
    an attachment structure attachable to an eyewear;
    two electrodes provided on a surface of the nose pad; and
    a substrate provided inside the nose pad and including a battery, a processor, an analog/digital converter, and a communication device.

2. The nose pad according to claim 1, wherein
    the battery, the processor, the analog/digital converter, and the communication device are provided on one surface of the substrate, and
    the two electrodes are provided on the other surface thereof.

3. The nose pad according to claim 2, wherein
    an acceleration sensor is further provided on the one surface.

4. The nose pad according to claim 3, wherein
    the attachment structure has a rotation mechanism that makes the nose pad attached to the eyewear rotatable, and
    the acceleration sensor is provided at a position adjacent to the rotation mechanism.

5. The nose pad according to claim 4, wherein
the rotation mechanism is a mechanism having one rotation axis.
6. The nose pad according to claim 5, wherein
a terminal that feeds power to the battery is provided on the surface on which the two electrodes are provided.
7. The nose pad according to claim 4, wherein
a terminal that feeds power to the battery is provided on the surface on which the two electrodes are provided.
8. The nose pad according to claim 3, wherein
a terminal that feeds power to the battery is provided on the surface on which the two electrodes are provided.
9. The nose pad according to claim 2, wherein
a terminal that feeds power to the battery is provided on the surface on which the two electrodes are provided.
10. The nose pad according to claim 1, wherein
a terminal that feeds power to the battery is provided on the surface on which the two electrodes are provided.
11. An eyewear comprising:
a frame; and
a nose pad attached to the frame, wherein
the nose pad includes
an attachment structure attachable to the frame,
two electrodes provided on a surface of the nose pad, and
a substrate provided inside the nose pad and including a battery, a processor, an analog/digital converter, and a communication device.

\* \* \* \* \*